(12) United States Patent
Bayer et al.

(10) Patent No.: US 7,736,732 B2
(45) Date of Patent: Jun. 15, 2010

(54) PROTECTIVE COATING FOR COMPONENTS OF A GAS TURBINE ENGINE

(75) Inventors: Erwin Bayer, Dachau (DE); Gerhard Wydra, Oberschleissheim (DE)

(73) Assignee: MTU Aero Engines GmbH, Munich (DE)

(*) Notice: Subject to any disclaimer, the term of this patent is extended or adjusted under 35 U.S.C. 154(b) by 1037 days.

(21) Appl. No.: 10/562,653

(22) PCT Filed: Jun. 19, 2004

(86) PCT No.: PCT/DE2004/001283

§ 371 (c)(1),
(2), (4) Date: Jun. 12, 2006

(87) PCT Pub. No.: WO2005/005690

PCT Pub. Date: Jan. 20, 2005

(65) Prior Publication Data

US 2006/0269759 A1 Nov. 30, 2006

(30) Foreign Application Priority Data

Jun. 27, 2003 (DE) ............................. 103 29 049

(51) Int. Cl.
*B32B 18/00* (2006.01)
*B05D 3/02* (2006.01)

(52) U.S. Cl. ................ 428/325; 428/330; 428/331; 428/426; 428/701; 427/372.2

(58) Field of Classification Search ................. 428/323, 428/325, 328, 330, 331, 457, 469, 472, 472.2, 428/472.3; 427/372.2

See application file for complete search history.

(56) References Cited

U.S. PATENT DOCUMENTS

| 3,149,001 A | | 9/1964 | Wallace |
| 4,347,085 A | | 8/1982 | Haselkorn et al. |
| 4,935,387 A | * | 6/1990 | Beall et al. ................. 501/3 |
| 5,985,454 A | * | 11/1999 | McMordie et al. .......... 428/413 |
| 6,165,600 A | * | 12/2000 | Ivkovich et al. ............. 428/213 |
| 7,311,944 B2 | * | 12/2007 | Sambasivan et al. ........ 427/328 |

FOREIGN PATENT DOCUMENTS

| DE | 198 07 636 C1 | 11/1999 |
| DE | 199 09 675 A1 | 9/2000 |
| GB | 123773 | 3/1919 |
| GB | 1123773 | 8/1968 |
| GB | 1226639 | 3/1971 |
| GB | 2 035 288 A | 6/1980 |

OTHER PUBLICATIONS

K.A. Maskall and D. White, Vitreous Enamelling, A Guide to Modern Enamelling Practice, Pergamon Press 1986, pp. 21, 23, 25, 27.

* cited by examiner

*Primary Examiner*—Gwendolyn Blackwell
(74) *Attorney, Agent, or Firm*—Crowell & Moring LLP

(57) ABSTRACT

A method for producing an erosion-resistant protective coating is disclosed. At least one lacquer material is provided wherein the lacquer material is a phosphate or silicate mixed with particles. Then, at least one layer of the lacquer material or each lacquer material is applied to a component that is to be protected from erosion. Then the applied lacquer layer or each applied lacquer layer is converted to a glass layer.

20 Claims, 2 Drawing Sheets

PROTECTIVE COATING FOR COMPONENTS OF A GAS TURBINE ENGINE

This application claims the priority of International Application No. PCT/DE2004/001283, filed Jun. 19, 2004, and German Patent Document No. 103 29 049.4, filed Jun. 27, 2003, the disclosures of which are expressly incorporated by reference herein.

BACKGROUND AND SUMMARY OF THE INVENTION

The present invention relates a method for producing a protective coating. In addition, the invention relates to a protective coating, a component having a protective coating and use of the protective coating.

In operation of components, in particular components of gas turbines at high temperatures, the free surfaces thereof are exposed to highly corrosive, erosive and oxidizing conditions. For use in gas turbines, such components may be made of a super alloy based on nickel or cobalt, for example. To protect against erosion or corrosion and oxidation, the components are provided with coatings. Coatings for preventing corrosion, oxidation and erosion are disclosed in German Patent Document DE 198 07 636 C1 and German Patent Document DE 199 09 675 A1.

Against this background, the present invention is based on the problem of creating a novel method for producing a protective coating and a novel protective coating. In addition, it is within the scope of the present invention to propose a component having a protective layer and a use of such a protective layer.

According to this invention, at least one lacquer material is provided, whereby the lacquer material is a phosphate or silicate, preferably mixed with particles. At least one layer of the lacquer material or of each lacquer material is applied to a component that is to be protected from erosion. The applied lacquer layer or each applied lacquer layer is converted to a glass layer.

According to an advantageous refinement of the present invention, multiple lacquer layers based either on phosphate or silicate are applied to the component, whereby the lacquer layers differ through the particles added. The component coated with the lacquer layers is heated and then cooled, with a phosphate-glass bond or a silicate-glass bond being formed between the originally separate and discrete lacquer layers.

The inventive protective layer may be formed with a layer sequence of at least two different layers, e.g., a lacquer layer based on phosphate or on silicate with added aluminum powder and/or with added hollow beads and a lacquer layer based on phosphate or silicate with added ceramic particles and/or nitrite particles, arranged with the layers in a repeating sequence and in this way to form a so-called multilayer laminate.

Preferred embodiments of the present invention are derived from the following description.

BRIEF DESCRIPTION OF THE DRAWINGS

Exemplary embodiments of the present invention are explained in greater detail below with reference to the figures without being limited to them. They show.

DETAILED DESCRIPTION OF THE DRAWINGS

Figure 1:
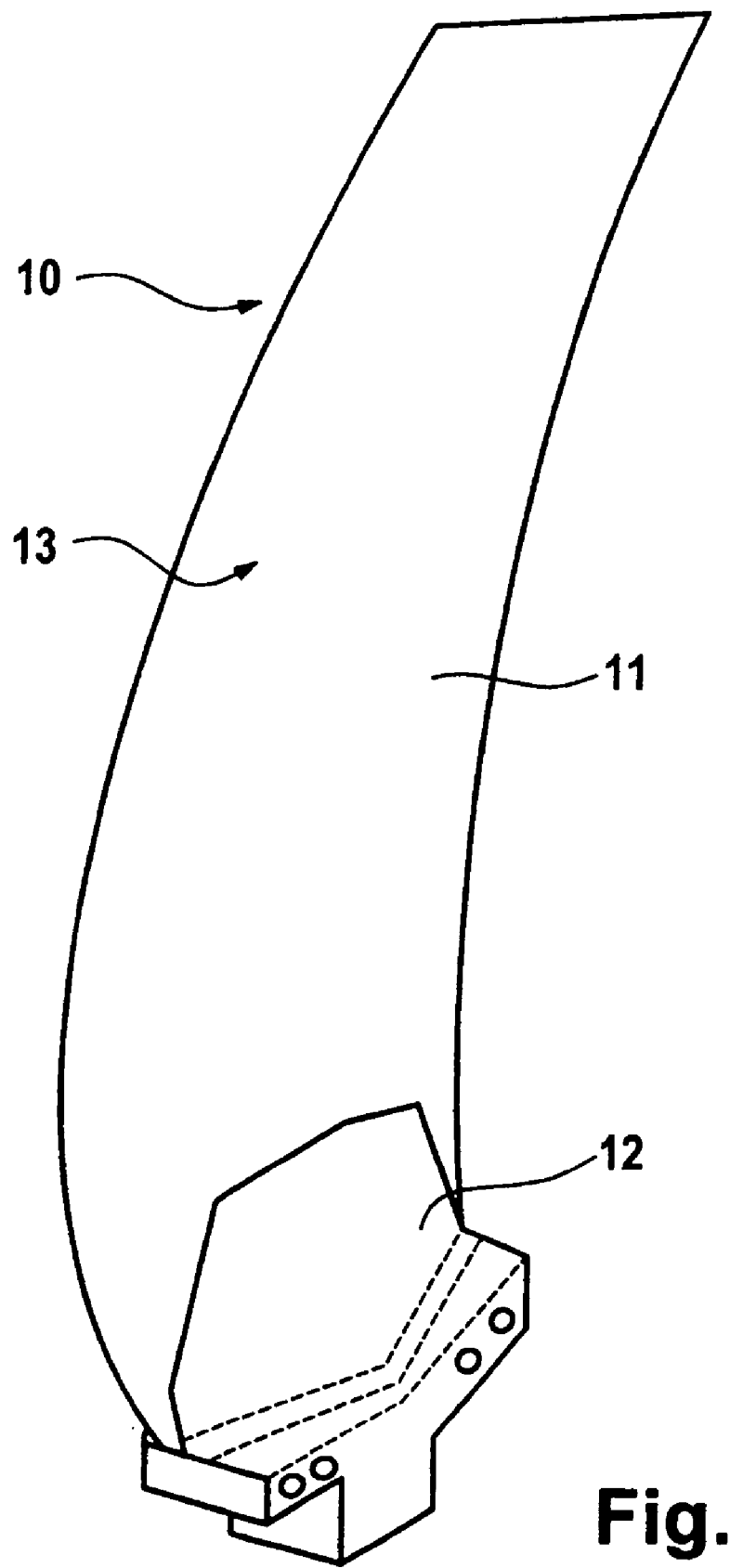
FIG. 1: a perspective view of a blade of a gas turbine.
Figure 2:
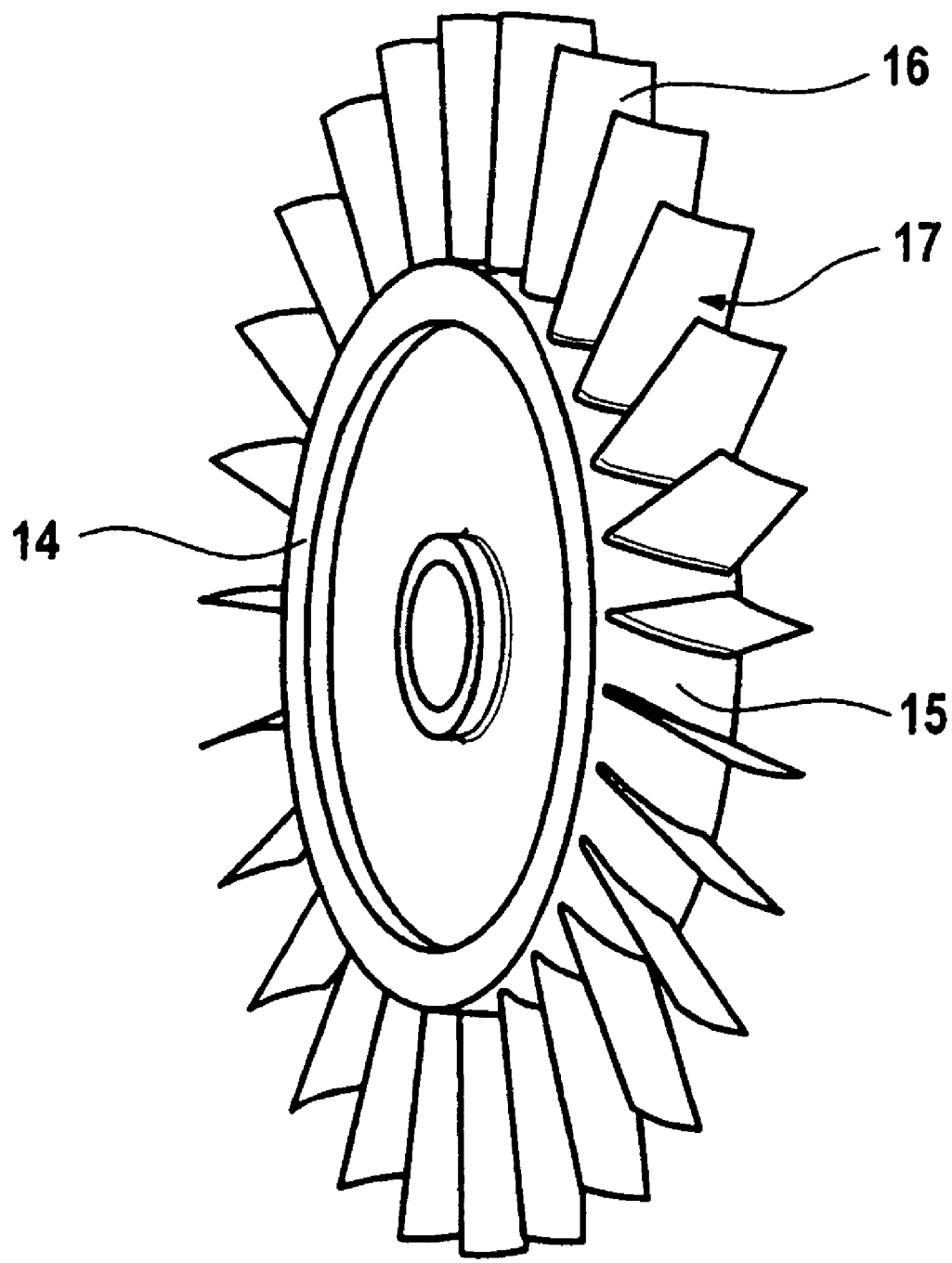
FIG. 2: a rotor of a gas turbine having integral blading.

The present invention is explained in greater detail below with reference to FIGS. 1 and 2. FIG. 1 shows a blade of a gas turbine; FIG. 2 shows a rotor of a gas turbine having integral blading. Both of these components are coated with the inventive protective layer which is applied to same in the scope of the inventive method.

To produce the erosion-resistant coating for a component, the surfaces of the component to be coated are preferably sandblasted before applying the coating to yield a bare metallic surface on the component.

Instead of sandblasting, of course any other method may also be used to yield a bare metallic surface.

In the inventive method for producing an erosion-resistant protective layer, the process is carried out in three main steps as described below. In a first main step, at least one lacquer material is prepared, whereby the lacquer material or each lacquer material is comprised of a phosphate-based or silicate-based material and particles are added to the lacquer material or to each lacquer material. In a second main step, at least one layer of the lacquer material or each lacquer material is applied to a component that is to be protected from erosion. Then in a third main step, the applied lacquer layer or each applied lacquer layer is converted to a glass layer. The individual main steps of the inventive method are described in greater detail below.

As mentioned above, in a first main step of the inventive method, at least one lacquer material is made available. The lacquer material is a phosphate or a silicate in which particles are embedded. If a component that is to be coated is coated with multiple lacquer layers, then multiple lacquer materials are provided, based either on phosphate or silicate and differing in the added particles. It is thus within the scope of the present invention to add an aluminum powder or hollow beads to the lacquer material based on phosphate or silicate. Such a lacquer material is then used preferably for a lacquer layer, i.e., a coating applied next to the component. In addition, it is within the scope of the present invention to provide a lacquer material based on phosphate or silicate to which ceramic particles or nitrite particles are added as the particles. Such a lacquer material is used preferably for an exterior layer of lacquer, i.e., coating at a distance from the component. It is thus within the scope of the present invention to coat a component that is to be coated and protected from erosion by applying multiple layers of lacquer materials, whereby these lacquer material layers are based either on silicate or phosphate. The individual layers differ through the particles added to the phosphate or silicate. Depending on whether the layer is applied next to the component or at a distance from the component, i.e., depending on whether the lacquer layer forms an inner coating or an outer coating, the tasks to be assumed by the lacquer layer will differ and thus the particles added to the phosphate or silicate will differ.

In a second main step of the inventive method, the component that is to be protected from erosion is preferably coated with multiple layers of the lacquer materials provided. The coating is performed by lacquering, i.e., by application by dipping, spraying or painting. These coating methods can be by using simple means and therefore inexpensive.

After application of the layer or each layer by the lacquering technique to the component that is to be protected from erosion, the coated component is subjected to a conversion treatment in which the coated component is heated and then cooled. It is within the scope of the present invention that in this conversion process, the lacquer layers based on phosphate or silicate are converted to a glass. To this end, the coated component is heated, as already mentioned, and then cooled without crystallizing the lacquer materials based on phosphate or silicate.

In this context, it is important that all the layers of a component that is to be protected from erosion are produced either with a lacquer material based on phosphate or a lacquer material based on silicate. In the conversion process, it is then ensured that the layers originally separated from one another will undergo a uniform phosphate glass bonding or silicate glass bonding. The layers originally separated from one another are thus converted to a single phosphate glass layer or silicate glass layer, whereby the different particles are embedded in the phosphate glass layer or the silicate glass layer, depending on the distance of the particles from the surface of the component to be coated. Thus the gradual difference in design and/or the gradual difference in composition of the coating is retained but without the problems of separate layers and/or coatings.

It is also within the scope of the present invention to apply an antifouling layer to the component as the final top layer. The term fouling is understood to refer to deposition of dirt particles or organisms on the surfaces of materials. So-called antifouling coatings thus prevent the adhesion of impurities to the surface of the component. Various antifouling coatings are known from the state of the art. The choice of a suitable antifouling layer is the responsibility of the aforementioned persons skilled in the art, as discussed here.

It is also within the scope of the present invention to apply the erosion-resistant protective coating to the components of a gas turbine around which the gas flows, in particular an aircraft jet. This may refer to all the components of a gas turbine with gas flowing. However, the use of the inventive protective layer on blades of a gas turbine or on rotors having integrated blading is preferred, namely so-called bladed disks (blisks) or so-called bladed rings (blings).

FIG. 1 thus shows in a highly schematic diagram a perspective view of a blade 10 of a gas turbine. The blade 10 comprises the pan 11 of the blade, which may be made of a fiber-reinforced plastic and is mounted on a metallic blade footing 12 made of a titanium-based alloy. Such a blade 10 is used in a compressor of a gas turbine, for example, and is mounted on a rotor ring and/or a rotor carrier with its blade footing 12. The design of the pan 11 of the blade made of fiber-reinforced plastic has proven to be advantageous with regard to weight reduction, but there are disadvantages in the inadequate wear properties with respect to erosion. For this reason, the blade 10 is coated with a protective layer 13, where the protective layer 13 is applied to the blade pan 11 and/or the entire blade 10 in the scope of the inventive method described above. The protective layer 13 thus consists essentially of a phosphate glass or a silicate glass with particles incorporated into the phosphate glass or silicate glass. Depending on the distance from the surface of the blade pan 11, different particles are incorporated into the phosphate glass or silicate glass. An aluminum powder is incorporated near the surface of the component and/or the blade pan 11. Alternatively, hollow beads may also be incorporated. Ceramic particles or nitrite particles may be incorporated into the phosphate glass or silicate glass at a distance from the component. Preferably an antifouling layer is applied as the final topcoat.

FIG. 2 shows an integrally bladed rotor 14 in a gas turbine that is not shown in detail. On its peripheral surface 15, the rotor 14 has multiple blades 16, which are an integral component of the rotor 14, arranged equidistantly in general and essentially extending radially. Such a rotor 14 having integral blading is also known as a bladed disk (blisk) or bladed ring (bling) depending on whether the rotor is designed as a disk or a ring. Such a rotor 10 having integral blading may have a poor wear performance with respect to erosion. To improve resistance to abrasive or erosive wear during operation of the rotor 14, it has an inventive protective layer 17. To avoid repetition, reference is made to the preceding discussion regarding this protective layer 17.

It is thus within the scope of the present invention to provide a protective layer against erosion for the components of a jet propulsion engine surrounded by gas flow by providing a component with at least one layer of an enamel material based on phosphate or silicate. Different particles may be incorporated into the lacquer material based on phosphate or silicate. In a downstream process, the component to be coated is subjected to a conversion process, wherein the phosphate or silicate is converted to a phosphate glass or silicate glass. In coating the component with multiple lacquer layers, the individual lacquer layers either form a phosphate glass bond or a silicate glass bond. The individual layers differ through the particles added to the phosphate or silicate.

The inventive protective layer can be manufactured inexpensively with simple means. The properties of the protective layer can be adjusted with precision by selecting and layering different layers. Adhesion of dirt particles or microorganisms is prevented by an antifouling layer. Due to the fact that the individual lacquer layers form a phosphate glass bond or a silicate glass bond after the conversion process, the problems of separate layers can be prevented. This avoids the risk of flaking of areas of the coating.

The invention claimed is:

1. A method for producing an erosion-resistant protective coating by providing at least one lacquer material, wherein the lacquer material is a phosphate or silicate mixed with particles, applying at least one layer of the lacquer material or each lacquer material to a component and converting the lacquer layer or each applied lacquer layer to a glass layer, wherein multiple lacquer layers based either on phosphate or silicate are applied to the component one above the other, with the lacquer layers differing due to the particles added to them and wherein the multiple lacquer layers applied to the component one above the other form a single glass layer during the converting.

2. The method according to claim 1, wherein a lacquer material based on phosphate or silicate with added aluminum powder and/or with added hollow beads is used for a lacquer layer applied next to the component.

3. The method according to claim 1, wherein a lacquer material based on phosphate or silicate with added ceramic particles and/or nitride particles is used for an exterior lacquer layer at a distance from the component.

4. The method according to claim 1, wherein an antifouling layer is applied to the component as an exterior layer forming a top layer.

5. The method according to claim 1, wherein a layer sequence of at least two different layers repeated a plurality of times is applied.

6. The method according to claim 1, wherein the component coated with the lacquer layers is heated in conjunction with converting the lacquer layers to the glass layer and then is cooled, a phosphate glass bond or a silicate glass bond being formed between the lacquer layers that were originally separate from one another.

7. The method according to claim 1, wherein the lacquer layers are applied by lacquering, in particular by dipping, spraying or painting.

8. The method according to claim 1, wherein the coated component is included in a gas turbine and wherein in a operable configuration the component has a gas flowing around it.

9. A protective layer, namely an erosion-resistant protective layer appliable to a surface to be protected on a component that is subject to mechanical and/or fluidic stress, wherein the protective layer consists essentially of a phosphate glass or a silicate glass with particles embedded in the phosphate glass or the silicate glass, wherein multiple layers of phosphate glass or silicate glass are applied one above the other and different particles are embedded in the layers depending on a distance from the component to be protected and wherein the multiple layers applied one above the other form a single glass layer.

10. The protective layer according to claim 9, wherein aluminum powder and/or hollow beads are incorporated in a layer to be applied next to the component.

11. The protective layer according to claim 9, wherein ceramic particles and/or nitride particles are incorporated in a layer to be applied at a distance from the component.

12. The protective layer according to claim 9, wherein an exterior layer forming a top layer is an antifouling layer.

13. The protective layer according to claim 9, wherein a layer sequence of at least two different layers is repeated a plurality of times.

14. The protective layer according to claim 9 in combination with a component of a gas turbine engine, in particular a jet propulsion engine, wherein in an operable configuration the component has a gas flowing around it, and wherein the protective layer is applied to the component.

15. A component of a gas turbine, wherein the component is coated with a protective layer consisting essentially of a phosphate glass or a silicate glass with particles embedded in the phosphate glass or the silicate glass, wherein multiple layers of phosphate glass or silicate glass are applied one above the other and different particles are embedded in the layers depending on a distance from the component and wherein the multiple layers applied one above the other form a single glass layer.

16. The component according to claim 15, wherein the component is included in a jet propulsion engine and wherein in an operable configuration the component has a gas flowing around it.

17. The component according to claim 16, wherein the component is a compressor rotor having integral blading.

18. A method for coating a component of a gas turbine engine, comprising the steps of:
   forming a first lacquer material of phosphate or silicate mixed with a first particle;
   forming a second lacquer material of phosphate or silicate mixed with a second particle;
   applying a layer of the first lacquer material to the component;
   applying a layer of the second lacquer material to the component, wherein the layer of the second lacquer material is applied above the layer of the first lacquer material; and
   converting the first and second lacquer layers to a single glass layer.

19. A protective layer for a component of a gas turbine engine, comprising:
   a first layer of a first lacquer material of phosphate or silicate mixed with a first particle applied to the component; and
   a second layer of a second lacquer material of phosphate or silicate mixed with a second particle applied to the component, wherein the second layer is disposed above the first layer;
   and wherein the applied first and second layers are converted to form a single glass layer.

20. The protective layer according to claim 19, wherein the first particle is an aluminum powder or a hollow bead and the second particle is a ceramic particle or a nitride particle.

* * * * *